Dec. 17, 1963 W. H. MOLES 3,114,795
COLOR TELEVISION RECEIVER WITH PENETRATION COLOR TUBE
Filed Nov. 20, 1961
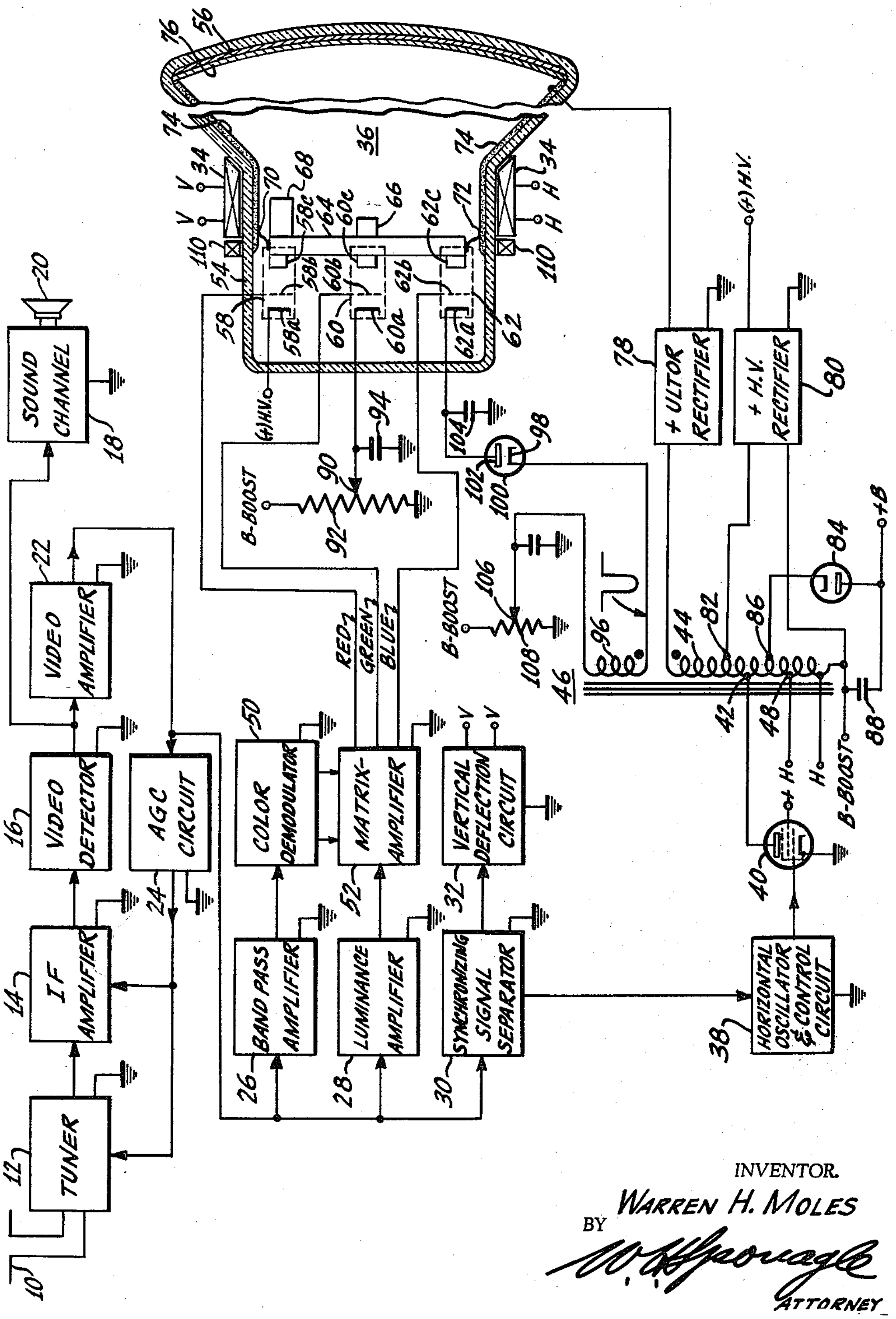
INVENTOR.
WARREN H. MOLES
BY
[signature]
ATTORNEY 3,114,795
COLOR TELEVISION RECEIVER WITH PENETRATION COLOR TUBE

Warren H. Moles, Trenton, N.J., assignor to Radio Corporation of America, a corporation of Delaware Filed Nov. 20, 1961, Ser. No. 153,286
7 Claims. (Cl. 178—5.4)

This invention relates to color television receivers, and more particularly to circuits for such receivers to provide adjustment of the size of the scanned rasters on a color image reproducing cathode ray tube of the receiver.

One type of color image display cathode ray tube that is capable of use in a color television receiver has an image reproducing phosphor screen that emits light under electron beam excitation, the color of the light emitted being dependent on the velocity of the electrons that excite the screen. This type of cathode ray tube may be referred to as a "penetration color tube," because the color of the light emitted depends upon the depth to which the electrons penetrate into the screen structure. The screen of the penetration color tube is capable of producing light of two or more colors when excited simultaneously by two or more electron beams having different velocities. In this manner, each beam excites effectively only one of the colors that the screen is capable of producing. Each electron beam is modulated in current intensity with signals representative of the particular color that the beam is to produce and is scanned in position on the screen, in the usual manner in television receivers, to produce three separate color rasters on the screen that merge to form a color light image.

In order to accelerate a plurality of separate electron beams in the penetration color tube to different velocities it has been found practical to maintain the final accelerating anode (ultor) of each of the separate electron guns that produce the separate electron beams at the same direct potential and to maintain the cathodes of each of the electron guns at different direct potentials. The electron beams emitted from the different electron guns are thus accelerated through different potentials and acquire different velocities. When using a penetration color tube having three electron guns and a phosphor screen that provides three primary colors, such as blue, green and red, having purity and brightness of commercial quality, it has been found that the differences in accelerating potentials for the three electron guns is on the order of several thousand volts.

In order to scan a television raster on the phosphor screen of the penetration color tube so that a proper color image is produced, the three electron beams should converge (strike the same point simultaneously) at all points on the scanned raster. It is therefore necessary to correct for the fact that the three electron beams do not originate from the same point in the tube. This type of correction is called "convergence correction" and is used at present in the commercial shadow mask color television tubes. It may also be necessary in a penetration color tube to correct for the different deflection that may be imparted to each of the beams by the raster scanning deflection yoke of the tube, since different deflections will be imparted to different velocity beams by a given magnetic deflection field. As an aid in the overall convergence of the electron beams in a penetration color tube, it is desirable to provide an individual control on the value of at least one of the accelerating voltages for the electron guns to allow manual adjustment of the size of the individual rasters scanned on the screen of the tube.

In accordance with one embodiment of the invention, a color television receiver utilizes a penetration color tube as a color image reproducing device having a plurality of electron guns to produce a plurality of electron beams.

The electron beams are accelerated through different potentials by maintaining the final accelerating anodes (or ultors) of all the guns at the same direct potential and by maintaining the cathodes of the guns at different direct potentials. Each of the beams is scanned across the screen of the tube by an electromagnetic deflection yoke to form a television raster. Adjustable means are provided to vary the accelerating potential of at least one of the electron guns by a small percentage, by varying its cathode potential, to adjust the size of the raster scanned on the screen of the tube by the electron beam from the gun, without substantially changing the color produced from the phosphor screen by the electron beam.

The invention will be more fully understood when the following detailed description is read with reference to the accompanying drawing, the sole FIGURE of which is a schematic diagram of a color television receiver having raster size adjusting circuits in accordance with the invention.

The color television receiver shown in the circuit diagram of the drawing includes an antenna 10 to intercept and supply a received radio frequency (RF) color television wave to a tuner 12. The RF color television wave includes an RF picture wave which is amplitude modulated with a composite color video signal (including a luminance, or black and white, signal and a color subcarrier amplitude and phase modulated with the color information) and an RF sound wave which is frequency modulated with a sound signal and which is spaced 4.5 megacycles from the RF picture wave, in accordance with present broadcasting standards. In the tuner 12 the received RF color television wave is heterodyned to an intermediate frequency wave (including an IF picture wave and an IF sound wave) which is applied to an intermediate frequency (IF) amplifier 14 where it is amplified and supplied to a video detector 16.

An intercarrier sound signal of 4.5 megacycles, resulting from the beat frequency between the IF picture wave and the IF sound wave, is derived from the video detector 16 and applied to a sound channel 18 where it is amplified, detected, and applied to a loudspeaker 20 to produce the sound represented by the modulation of the originally received RF sound wave.

The composite color video signal is also detected by the video detector 16 from the IF picture wave, and is applied to a video amplifier 22 where it is amplified and applied to several points in the receiver for further processing, i.e., to an automatic gain control (AGC) circuit 24, a bandpass amplifier 26, a luminance amplifier 28, and synchronizing signal separator 30.

The AGC circuit 24 generates a control voltage that is responsive to the strength of the composite color video signal and supplies it to the tuner 12 and IF amplifier 14 of the receiver to control their respective gains. The synchronizing signal separator 30 of a television receiver separates the horizontal and vertical synchronizing signals from the composite color video signal. The vertical synchronizing signals are applied to a vertical deflection circuit 32 to generate deflection signals that are applied to vertical deflection windings (not shown) of an electromagnetic, electron beam deflection yoke 34 surrounding the neck of a penetration color tube 36 to deflect the electron beam of the tube in a vertical direction. The horizontal synchronizing signals are applied from the synchronizing signal separator 30 to a horizontal oscillator and control circuit 38 to generate horizontal deflection driving signals that are applied to the first control grid of a horizontal output tube 40. Amplified horizontal deflection driving signals are available at the anode of the horizontal output tube 40 and applied to an intermediate tap 42 on a first winding 44 of a horizontal output transformer 46. The positive high voltage end of the first winding 44 is indicated by a dot. The horizontal deflection windings (not shown) of the yoke 34 for deflecting the electron beams of the tube 36 in a horizontal direction are connected between an intermediate yoke tap 48 and the low voltage end of the first winding 44. The combined vertical and horizontal deflections provide the usual television raster scanning for the tube 36.

The luminance amplifier 28 amplifies the luminance signal portion of the composite color video signals, and the bandpass amplifier 26 separates and amplifies the color subcarrier wave and applies it to a color demodulator 50 which derives a pair of output signals representative of the color information contained in the color subcarrier wave. The output signals from the color demodulator 50 and the luminance signal from the luminance amplifier 28 are applied to a matrix-amplifier 52 which derives therefrom individual output signals representative of the intensities of the various color components of the image, i.e., "blue" signals, "green" signals, and "red" signals, available on the leads marked "red," "green" and "blue," respectively. The red, green and blue signals are applied, individually, to the penetration color tube 36 in a manner explained in greater detail hereinafter.

The penetration color tube 36 has an envelope 54 within which are included a light emitting phosphor screen 56 and a trio of electron guns 58, 60 and 62. The gun 58 will be hereinafter referred to as the "red" gun; the gun 60 as the "green" gun, and the gun 62 as the "blue" gun. The light emitting phosphor screen 56 is of the type that emits light under electron excitation, the color of the light being dependent on the velocity of the exciting electrons. The screen 56 may be, for example, constructed in a manner specified in U.S. Patent No. 2,590,018, issued on March 18, 1952, to L. R. Koller, and entitled, "Production of Colored Images."

The electron guns 58, 60, and 62 each at least include, respectively, cathodes 58*a*, 60*a*, 62*a*; control electrodes 58*b*, 60*b*, 62*b*; and final anodes 58*c*, 60*c*, 62*c*. The final anodes 58*c*, 60*c*, 62*c* are electrically connected to a common convergence cage 64, which may be similar to the convergence cages presently used in shadow mask color television tubes, and includes individual magnetic pole pieces (not shown) associated with each electron gun 58, 60, 62 and arranged such that external magnetic fields may be applied through the envelope 54 to the pole pieces to control the position of each of the electron beams, individually. While the electron guns 58, 60, 62 are shown side-by-side for clarity of illustration, it is to be understood that they are mounted in the tube in the same manner as in a shadow mask color television tube, i.e., the guns being equidistant from a common axis and spaced apart by equal angles.

Positioned in front of the green gun 60 is a first magnetic shunt 66, also called a magnetic shield member, to shield the electron beam emitted by the green gun 60 from the effect of a magnetic electron beam deflecting field applied to the tube 36 by the yoke 34 for a portion of the beam travel through the deflecting region of the tube 36. The deflecting region is within the yoke 34, that is, between the guns 58, 60, 62 and the screen 56 and adjacent the guns 58, 60, 62. A second magnetic shunt 68, longer than the first magnetic shunt 66, is positioned in front of the red gun 58 so that the electron beam from the red gun 58 is shielded from the action of the deflecting field for a larger portion of its travel through the deflecting region than is the green beam. No shielding is provided for the electron beam from the blue gun 62.

The convergence cage 64 is connected by contact strips 70, 72 to a conductive coating 74 on the inner surface of the envelope 54. The conductive coating 74 may be "aquadag," which is used as an internal conductive coating in many present commercial black and white and shadow-mask color television tubes. The conductive coating 74 is, in turn, connected to an aluminum backing 76 on the phosphor screen 56. An accelerating voltage, (+) ultor voltage, is applied through the envelope 54 to the conductive coating 74, to maintain the conductive coating 74, the aluminum backing 76, the final anodes 58*c*, 60*c*, 62*c*, the convergence cage 64, and the magnetic shunts 66 and 68 at the value of the (+) ultor voltage. The (+) ultor voltage is generated by a circuit of the well-known "flyback" type, by connecting a (+) ultor rectifier 78 to the high voltage end of the first winding 44 on the horizontal output transformer 46 to rectify the "flyback" pulse across the first winding 44. In addition, a positive high, voltage, (+) HV, less in absolute value than the (+) ultor voltage, is generated by a (+) HV rectifier 80 connected to an intermediate (+) HV tap 82 on the first winding 44 of the transformer 46.

A conventional B-boost circuit is provided by connecting the cathode of a damper tube 84 to a damper tap 86 on the first winding 44 of the transformer 46 and the anode to the low voltage power supply, +B (not shown), of the receiver. A B-boost capacitor 88 is connected between the low voltage end of the first winding 44 and the low voltage power supply +B. The B-boost voltage is available at the low voltage end of the winding 44 in the usual manner.

The "red," "green" and "blue" signals from the matrix amplifier 52 are applied, respectively, to the control grids 58*b*, 60*b*, 62*b* of the electron guns 58, 60, 62 to current modulate the intensity of each of the electron beams in accordance with the signals.

In order to provide a different accelerating voltage for each of the electron beams from the electron guns 58, 60, 62, the high direct voltages are applied to the tube 36 in the following manner: (1) The (+) ultor voltage is applied through the tube envelope 54 to the internal conductive coating 74 and thus, to the final anodes 58*c*, 60*c*, 62*c* of all three electron guns. (2) The cathode 58*a* of the red gun 58 is connected directly to the (+) HV voltage from the (+) HV rectifier 80. (3) The cathode 60*a* of the green gun 60 is connected to an adjustable tap 90 on a green raster size control potentiometer 92 that has its extremities connected between the B-boost voltage and ground for the receiver. The adjustable tap 90 is shunted to ground for signal frequencies by a by-pass capacitor 94. Adjustment of the position of the tap 90 on the potentiometer 92 varies the direct voltage on the cathode 60*a* of the green gun 60 between zero and the B-boost voltage. (4) The cathode 62*a* of the blue gun is connected to a source of direct voltage negative with respect to ground, in order that the electrons from the blue gun 62 are accelerated through a greater potential than those of the red and green guns 58, 60. The negative voltage may be provided by a second winding 96 on the horizontal output transformer 46 which supplies a negative going flyback pulse to the cathode 98 of an auxiliary rectifier diode 100. The anode 102 of the auxiliary rectifier diode 100 is connected to ground through a filter capacitor 104. The voltage appearing across the filter capacitor 104 is negative with respect to ground and is applied directly to the cathode 62*a* of the blue gun 62. The low voltage end of the second winding 96 is connected to an adjustable tap 106 on a blue size control potentiometer 108 that is connected at its extremities between the B-boost voltage and ground for the receiver. Adjustment of the position of the variable tap 106 on the potentiometer 108 varies the direct reference potential of the cathode 98 of the auxiliary rectifier diode 100 in a range from ground (zero voltage) to the B-boost voltage. All or a portion of the B-boost voltage may be thus added to the direct voltage generated by rectification to supply the final voltage across the filter capacitor 104 which supplies the direct voltage to the cathode 62*a* of the blue gun 62.

The total accelerating potential for the blue gun 62 is thus the sum of the absolute value of the (+) ultor voltage and the voltage across the filter capacitor 104 which is determined by the position of the adjustable tap 106 of the blue size control potentiometer 108; the accelerating potential for the green gun 60 is equal to the difference between the (+) ultor voltage and the voltage on the cathode 60*a* determined by the position of the adjustable tap 90 on the green size control potentiometer 92; and the accelerating potential for the red gun 58 is equal to the difference between the absolute values of the (+) ultor voltage and the (+) HV voltage.

With certain types of electron guns it may be necessary to supply screen and focus voltages for their operation, but since such circuits form no part of the present invention, they have not been illustrated.

In order to deflect the electron beams from the guns 58, 60, 62 to scan a television raster on the screen 56, the electromagnetic deflection yoke 34 surrounding the neck of the tube 36, is driven by deflection signals to provide a time varying magnetic field in the deflecting region of the tube 36, that is, in the region immediately adjacent the guns 58, 60, 62 through which the electron beams must pass to strike the light emitting screen 56. The amount of deflection imparted to an electron beam is directly proportional to the strength of the magnetic field and the length of field through which the beam must pass, and inversely proportional to the square root of the velocity of the electrons. Thus, if three different velocity electron beams traverse the same magnetic field in the deflecting region of the tube 36 they would be deflected by different amounts (the highest velocity beam being deflected the least) and would not strike the screen 56 at the proper points to scan the same size rasters. Thus, the blue beam which has the greatest velocity would not be deflected through as great an angle, by a given magnetic field, as would the red beam which has the least velocity. The green beam would be deflected through a greater angle than the blue beam but not as great as the red beam, since it is traveling at a slower velocity than the blue beam although at a faster velocity than the red beam.

It is necessary, however, to insure that the electron beams from all three guns 58, 60, 62 scan the same size rasters on the screen 56, and it is for this reason that the magnetic shunts 66, 68 are used. The shunts 66, 68 are made of magnetic material to prevent the deflecting field of the yoke 34 from affecting an electron beam while the beam is within the shunt. The first magnetic shunt 66 is made of a length such that the green beam is effectively within the deflecting region of the tube 36, for a shorter distance than the blue beam so that it will essentially be subjected to the same degree of deflection, by a particular magnetic field, as the blue beam. The second magnetic shunt 68 is longer than the first magnetic shunt 66 so that the red beam is effectively in the deflecting region of the tube 36 for a shorter distance than both the green and blue beams so that its degree of deflection will be substantially the same as that of the green and blue beams.

It will also be seen that, as in the shadow mask color television tube, the three electron beams originate from the spaced points within the tube 36 and in order for the beams from the three guns 58, 60, 62 to strike the screen 56 at the same point, even after compensation for their varying velocities by the magnetic shunts 66, 68, some form of beam convergence action is necessary. The convergence action is supplied by convergence magnetic fields which may be generated in a known manner and applied to a convergence yoke 110 positioned on the outside of the envelope 54 of the tube 36 over the convergence cage 64, so that individual convergence magnetic fields are applied to the electron beams through the convergence cage 64 to modify, independently, the position of each electron beam so that they simultaneously strike the screen 56 at the same points in the raster.

It will be appreciated that there may be individual variations in the electron guns 58, 60, 62 because of manufacturing tolerances used in penetration color tube fabrication, and in circuit tolerances used in the mass production of television receivers. Because of these tolerances the rasters scanned by the three electron beams may not be approximately the same size. The accelerating voltages for the green and blue guns 60, 62 may be varied by the amount of the voltage available across the green and blue size control potentiometers 92, 108 to enable proper match of the raster sizes. Specifically, by using the green size control potentiometer 92 and the blue size control potentiometer 108 the accelerating voltages applied to the blue and green electron guns 60 and 62 may be individually adjusted with respect to the (+) ultor voltage and the (+) HV voltage on the red gun 54 to control the size of the rasters scanned on the screen 56 by the blue and green beams. Since the (+) ultor voltage and the (+) HV voltage may be controlled by varying the drive to the transformer 46, as is done in present black and white and color receivers, an independent control for each of the red, blue, and green raster sizes is obtained to greatly simplify the problems of registering a full three color image on the face of the penetration color tube 36. It should also be recognized that proper registration of the rasters by the electron beams may be effected by using only one raster size control circuit if the design and fabrication of the penetration color tube 36 is sufficiently accurate.

What is claimed is:

1. In a color television receiver including an image reproducing cathode ray tube having a plurality of electron guns for producing a plurality of electron beams and an image reproducing screen which produces different colors of light in response to excitation by different velocity electron beams, each of said electron guns having a cathode and an accelerating anode, said receiver further including horizontal and vertical electromagnetic electron beam deflection circuits for deflecting the electron beams of said tube to scan a plurality of television rasters on said screen, one by each of said electron beams, a raster size adjusting circuit, comprising in combination:

means providing a first source of direct voltage, positive with respect to a point of fixed reference potential for said receiver, connected to the accelerating anodes of said plurality of electron guns;

means providing a second source of direct voltage connected to the cathode of a first of said plurality of electron guns to provide in conjunction with said first source a first accelerating voltage for said first of said plurality of electron guns, said first accelerating voltage imparting a velocity to the electron beam of said first electron gun to produce a first color on said screen;

means providing a third source of direct voltage connected to the cathode of a second of said plurality of electron guns to provide in conjunction with said first source a second accelerating voltage, different than said first accelerating voltage, for said second of said plurality of electron guns, said second accelerating voltage imparting a velocity to the electron beam of said second electron gun to produce a second color on said screen; and means for adjusting the voltage of the cathode of one of said electron guns to vary the accelerating voltage for said one of said electron guns to adjust the size of the raster scanned on the screen of said tube by the electron beam from said one of said electron guns with respect to the raster scanned by the electron beam from the other of said electron guns.

2. In a color television receiver including an image reproducing cathode ray tube having a plurality of electron guns for producing a plurality of electron beams and an image reproducing screen which produces different colors of light in response to excitation by different velocity electron beams, each of said electron guns having a cathode and an accelerating anode, said receiver further including horizontal and vertical electromagnetic electron beam deflection circuits for deflecting the electron beams of said tube to scan a plurality of television rasters on said screen, one by each of said electron beams, a raster size adjusting circuit, comprising in combination:

means providing a first source of direct voltage, positive with respect to a point of fixed reference potential for said receiver, connected to the accelerating anodes of said plurality of electron guns;

means providing a second source of direct voltage, positive with respect to the point of reference potential for said receiver and less in absolute voltage value than said first source, connected to the cathode of a first of said plurality of electron guns to provide in conjunction with said first source a first accelerating voltage for said first of said plurality of electron guns, said first accelerating voltage imparting a velocity to the electron beam of said first electron gun to produce a first color on said screen;

means providing a third source of direct voltage, positive with respect to the point of reference potential for said receiver and less in absolute voltage value than said second source, connected to the cathode of a second of said plurality of electron guns to provide in conjunction with said first source a second accelerating voltage for said second of said plurality of electron guns, said second accelerating voltage imparting a velocity to the electron beam of said second electron gun to produce a second color on said screen; and means for adjusting the voltage of the cathode of one of said electron guns to vary the accelerating voltage for said one of said electron guns to adjust the size of the raster scanned on the screen of said tube by the electron beam from said one of said electron guns with respect to the raster scanned by the electron beam from the other of said electron guns.

3. In a color television receiver including an image reproducing cathode ray tube having a plurality of electron guns for producing a plurality of electron beams and an image reproducing screen which produces different colors of light in response to excitation by different velocity electron beams, each of said electron guns having a cathode and an accelerating anode, said receiver further including horizontal and vertical electromagnetic electron beam deflection circuits for deflecting the electron beams of said tube to scan a plurality of television rasters on said screen, one by each of said electron beams, a raster size adjusting circuit, comprising in combination:

means providing a first source of direct voltage, positive with respect to a point of fixed reference potential for said receiver, connected to the accelerating anodes of said plurality of electron guns;

means including a second source of direct voltage, positive with respect to the point of reference potential for said receiver and less in absolute value than said first source, connected to the cathode of a first of said plurality of electron guns to provide in conjunction with said first source a first accelerating voltage for said first of said plurality of electron guns, said first accelerating voltage imparting a velocity to the electron beam of said first electron gun to produce a first color on said screen; and means including a source of manually adjustable direct voltage, positive with respect to the point of reference potential for said receiver and having a maximum voltage value less in absolute value than said second source, connected to the cathode of a second of said plurality of electron guns to provide in conjunction with said first source a manually adjustable accelerating voltage for said second of said plurality of electron guns for adjusting the size of the raster scanned on the screen of said tube by the electron beam from said second of said plurality of electron guns with respect to the size of the raster scanned by the electron beam from said first of said plurality of electron guns, said manually adjustable accelerating voltage imparting a velocity to the electron beam of said electron gun to produce a second color on said screen.

4. In a color television receiver including an image reproducing cathode ray tube having a plurality of electron guns for producing a plurality of electron beams and an image reproducing screen which produces different colors of light in response to excitation by different velocity electron beams, each of said electron guns having a cathode and an accelerating anode, said receiver further including horizontal and vertical electromagnetic electron beam deflection circuits for deflecting the electron beams of said tube to scan a plurality of television rasters on said screen, one by each of said electron beams, a raster size adjusting circuit, comprising in combination:

a first source of direct voltage positive with respect to a point of fixed reference potential for said receiver;

means connecting said first source to the accelerating anodes of said plurality of electron guns;

a second source of direct voltage negative with respect to the point of reference potential for said receiver;

means connecting said second source to the cathode of a first of said plurality of electron guns to provide in conjunction with said first source a first accelerating voltage for said first of said plurality of electron guns, said first accelerating voltage imparting a velocity to the electron beam of said first electron gun to produce a first color on said screen;

a manually adjustable source of direct voltage positive with respect to the point of reference potential for said receiver; and means connecting said manually adjustable source to the cathode of a second of said plurality of electron guns to provide in conjunction with said first source a manually adjustable accelerating voltage for said second of said plurality of electron guns with respect to the accelerating voltage for said first of said plurality of electron guns, said manually adjustable accelerating voltage imparting a velocity to the electron beam of said electron gun to produce a second color on said screen.

5. In a color television receiver including an image reproducing cathode ray tube having a plurality of electron guns for producing a plurality of electron beams and an image reproducing screen which produces different colors of light in response to excitation by different velocity electron beams, each of said electron guns having a cathode and an accelerating anode, said receiver including horizontal and vertical electromagnetic electron beam deflection circuits for deflecting the electron beams of said tube to scan a plurality of television rasters on said screen, one by each of said electron beams, a raster size adjusting circuit, comprising in combination:

means providing a first source of direct voltage, positive with respect to a point of fixed reference potential for said receiver, connected to the accelerating anodes of said plurality of electron guns;

means including a second source of direct voltage, positive with respect to the point of reference potential for said receiver and less in absolute value than said first source, connected to the cathode of a first of said plurality of electron guns, to provide in conjunction with said first source a first accelerating voltage for said first of said plurality of electron guns, said first accelerating voltage imparting a velocity to the electron beam of said first electron gun to produce a first color on said screen;

means including a first manually adjustable source of direct voltage, negative with respect to the point of reference potential for said receiver, connected to a second of said plurality of electron guns to provide in conjunction with said first source a first manually adjustable accelerating voltage for said second of said plurality of electron guns to adjust the size of the raster scanned on the screen of said tube by the electron beam of said second of said plurality of electron guns with respect to the raster scanned by the electron beam from said first of said plurality of electron guns, said first manually adjustable accelerating voltage imparting a velocity to the electron beam of said second electron gun to produce a second color on said screen; and means providing a second source of manually adjustable direct voltage, positive with respect to the point of reference potential for said receiver and having a maximum voltage value less in absolute value than said second source, connected to the cathode of a third of said plurality of electron guns to provide in conjunction with said first source a second manually adjustable accelerating voltage for said third of said plurality of electron guns to adjust the size of the raster scanned on the screen of said tube by the electron beam of said third of said plurality of electron guns with respect to the raster scanned on said screen by the electron beam from said first of said plurality of electron guns, said second manually adjustable accelerating voltage imparting a velocity to the electron beam of said third electron gun to produce a third color on said screen.

6. In a color television receiver including an image reproducing cathode ray tube having three electron guns for producing three electron beams and an image reproducing screen, each of said electron guns having a cathode and an accelerating anode, said receiver further including horizontal and vertical electromagnetic electron beam deflection circuits for deflecting the electron beams of said tube to scan three television rasters on said screen, one by each of said electron beams, a raster size adjusting circuit, comprising in combination:

a first source of direct voltage positive with respect to a point of fixed reference potential for said receiver;

means connectnig said first source to the accelerating anodes of said electron guns;

a second source of direct voltage positive with respect to the point of reference potential for said receiver and less in absolute value than said first source;

means connecting said second source to the cathode of a first electron gun to provide in conjunction with said first source an accelerating voltage for said first electron gun;

a third source of direct voltage positive with respect to the point of reference potential for said receiver and having a voltage value less in absolute voltage value than said second source;

means for applying a manually selectable portion of the voltage of said third source to the cathode of a second electron gun to provide in conjunction with said first source a manually adjustable accelerating voltage for said second electron gun to adjust the size of the raster scanned on the screen of said tube by the electron beam of said second electron gun with respect to the size of the raster scanned by the electron beam of said first; electron gun;

rectifier circuit means for providing a fourth source of direct voltage negative with respect to the point of reference potential for said receiver;

means for connecting said fourth source to the cathode of a third electron gun to provide in conjunction with said first source an accelerating voltage for said third electron gun; and means for applying a manually selectable portion of the voltage from said third source to said rectifier means to vary the magnitude of the voltage of said fourth source and the accelerating voltage of said third gun to adjust the size of the raster scanned on the screen of said tube by the electron beam of said third electron gun with respect to the size of the raster scanned by the electron beam of said first electron gun.

7. In a color television receiver including an image reproducing cathode ray tube having three electron guns for producing three electron beams and an image reproducing screen, each of said electron guns having a cathode and an accelerating anode, said receiver further including horizontal and vertical electromagnetic electron beam deflection circuits for deflecting the electron beams of said tube to scan three television rasters on said screen, one by each of said electron beams, a raster size adjusting circuit, comprising in combination:

means providing a first source of direct voltage positive with respect to a point of fixed reference potential for said receiver, connected to the accelerating anodes of said three electron guns;

means providing a second source of direct voltage connected to the cathode of a first of said electron guns to provide in conjunction with said first source a first accelerating voltage for said first of said electron guns;

means providing a third source of direct voltage connected to the cathode of a second of said three electron guns to provide in conjunction with said first source a second accelerating voltage, different than said first accelerating voltage, for said second of said electron guns;

rectifier circuit means for providing a fourth source of direct voltage negative with respect to the point of reference potential for said receiver;

means for connecting said fourth source to the cathode of the third of said three electron guns to provide in conjunction with said first source an accelerating voltage for said third electron guns; and means for applying a manually selectable portion of the voltage from said third source to said rectifier means to vary the magnitude of the voltage of said fourth source and the accelerating voltage of said third gun to adjust the size of the raster scanned on the screen of said tube by the electron beam of said third electron gun with respect to the size of the raster scanned by the electron beam of said first electron gun.

References Cited in the file of this patent

UNITED STATES PATENTS

| | | |
|---|---|---|
| 2,774,003 | Leverenz | Dec. 11, 1956 |
| 2,839,600 | Graser | June 17, 1958 |
| 2,868,872 | Espenlaub | Jan. 13, 1959 |